(12) United States Patent
Dalton et al.

(10) Patent No.: US 10,311,014 B2
(45) Date of Patent: Jun. 4, 2019

(54) SYSTEM, METHOD AND COMPUTER READABLE MEDIUM FOR OFFLOADED COMPUTATION OF DISTRIBUTED APPLICATION PROTOCOLS WITHIN A CLUSTER OF DATA PROCESSING NODES

(71) Applicant: III Holdings 2, LLC, Wilmington, DE (US)

(72) Inventors: Niall Joseph Dalton, Mountain View, CA (US); Trevor Robinson, Austin, TX (US)

(73) Assignee: III Holdings 2, LLC, Wilmington, DE (US)

( * ) Notice: Subject to any disclaimer, the term of this patent is extended or adjusted under 35 U.S.C. 154(b) by 162 days.

(21) Appl. No.: 14/137,940

(22) Filed: Dec. 20, 2013

(65) Prior Publication Data
US 2014/0189039 A1 Jul. 3, 2014

Related U.S. Application Data

(60) Provisional application No. 61/747,022, filed on Dec. 28, 2012.

(51) Int. Cl.
*G06F 15/173* (2006.01)
*H04L 12/26* (2006.01)
*G06F 9/50* (2006.01)

(52) U.S. Cl.
CPC ...... *G06F 15/17331* (2013.01); *G06F 9/5061* (2013.01); *H04L 43/0876* (2013.01);
(Continued)

(58) Field of Classification Search
CPC .. G06F 15/17331; G06F 9/5061; G06F 12/08; G06F 2209/509; H04L 43/0876
See application file for complete search history.

(56) References Cited

U.S. PATENT DOCUMENTS

2003/0065784 A1* 4/2003 Herrod ............... H04W 28/18
  709/227
2004/0073908 A1* 4/2004 Benejam ............. G06F 9/5083
  718/105
(Continued)

OTHER PUBLICATIONS

Non-Final Office Action on U.S. Appl. No. 14/137,921, dated Oct. 8, 2015.
(Continued)

*Primary Examiner* — Philip J Chea
*Assistant Examiner* — Wuji Chen
(74) *Attorney, Agent, or Firm* — Foley & Lardner LLP

(57) ABSTRACT

A data processing node includes a management environment, an application environment, and a shared memory segment (SMS). The management environment includes at least one management services daemon (MSD) running on one or more dedicated management processors thereof. One or more application protocols are executed by the at least one MSD on at least one of the dedicated management processors. The management environment has a management interface daemon (MID) running on one or more application central processing unit (CPU) processors thereof. The SMS is accessible by the at least one MSD and the MID for enabling communication of information of the one or more application protocols to be provided between the at least one MSD and the MID. The MID provides at least one of management service to processes running within the application environment and local resource access to one or more processes running on another data processing node.

3 Claims, 10 Drawing Sheets

(52) U.S. Cl.
CPC ........ *G06F 2209/509* (2013.01); *Y02D 10/22* (2018.01); *Y02D 10/36* (2018.01)

(56) References Cited

U.S. PATENT DOCUMENTS

| | | | |
|---|---|---|---|
| 2005/0038808 A1 | 2/2005 | Kutch | |
| 2006/0120411 A1* | 6/2006 | Basu | G04L 45/46 370/539 |
| 2006/0250971 A1* | 11/2006 | Gammenthaler, Jr. | H04L 43/00 370/241 |
| 2008/0034082 A1 | 2/2008 | McKinney | |
| 2008/0270731 A1* | 10/2008 | Bryant | G06F 9/5016 711/170 |
| 2008/0289029 A1* | 11/2008 | Kim | G06F 17/30905 726/12 |
| 2009/0010153 A1* | 1/2009 | Filsfils | H04L 45/02 370/218 |
| 2009/0055542 A1* | 2/2009 | Zhao | H04L 29/06 709/228 |
| 2009/0063690 A1* | 3/2009 | Verthein et al. | H04L 67/14 709/228 |
| 2010/0121947 A1* | 5/2010 | Pirzada | H04L 12/40006 709/224 |
| 2010/0325371 A1* | 12/2010 | Jagadish | G06F 11/3476 711/150 |
| 2011/0055627 A1* | 3/2011 | Zawacki | H04L 67/14 714/15 |
| 2011/0153953 A1* | 6/2011 | Khemani | G06F 12/0895 711/136 |
| 2011/0154318 A1* | 6/2011 | Oshins | G06F 9/45537 718/1 |
| 2011/0173295 A1* | 7/2011 | Bakke | G06F 9/5027 709/217 |
| 2011/0274108 A1* | 11/2011 | Fan | H04L 12/4633 370/390 |
| 2011/0320540 A1 | 12/2011 | Oostlander et al. | |
| 2012/0167083 A1 | 6/2012 | Suit | |
| 2012/0167084 A1 | 6/2012 | Suit | |
| 2012/0167094 A1* | 6/2012 | Suit | G06F 9/5077 718/100 |
| 2013/0094499 A1 | 4/2013 | Davis et al. | |
| 2013/0145375 A1* | 6/2013 | Kang | G06F 21/53 718/104 |
| 2013/0286840 A1* | 10/2013 | Fan | H04L 12/4633 370/235 |
| 2013/0305093 A1 | 11/2013 | Jayachandran et al. | |
| 2014/0082614 A1 | 3/2014 | Klein et al. | |
| 2014/0135105 A1* | 5/2014 | Quan | H04L 67/1095 463/24 |
| 2014/0143773 A1 | 5/2014 | Ciano et al. | |

OTHER PUBLICATIONS

Final Office Action on U.S. Appl. No. 14/137,921 dated May 6, 2016.
U.S. Appl. No. 13/899,751, filed May 22, 2013, Prashant R. Chandra.
U.S. Appl. No. 13/935,108, filed Jul. 3, 2013, Mark Bradley Davis.
U.S. Appl. No. 13/959,428, filed Aug. 5, 2013, Prashant R. Chandra.
Non-Final Office Action on U.S. Appl. No. 14/137,921 dated Oct. 6, 2016.
Final Office Action on U.S. Appl. No. 14/137,921 dated May 31, 2017.

* cited by examiner

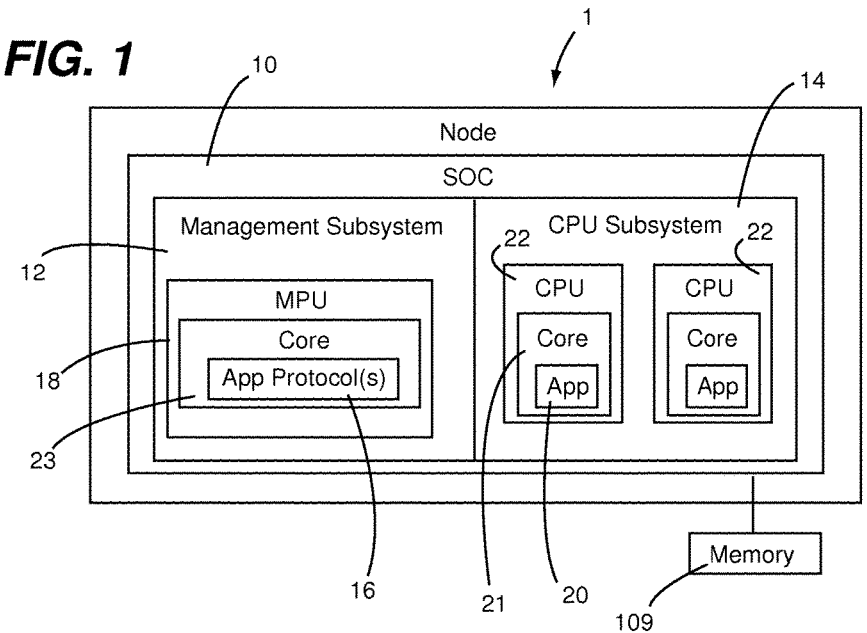
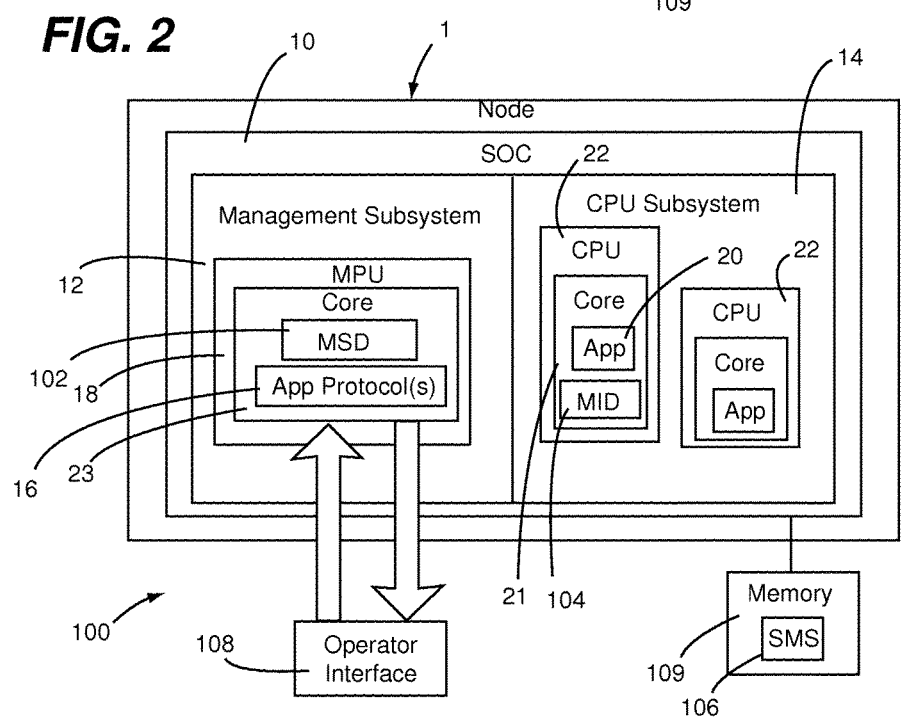

SYSTEM, METHOD AND COMPUTER READABLE MEDIUM FOR OFFLOADED COMPUTATION OF DISTRIBUTED APPLICATION PROTOCOLS WITHIN A CLUSTER OF DATA PROCESSING NODES

CROSS REFERENCE TO RELATED APPLICATIONS

This patent application claims priority from U.S. Provisional Patent Application having Ser. No. 61/747,022, filed 28-Dec. 2012, entitled "FLEET SERVICE SOLUTIONS", having a common applicant herewith and being incorporated herein in its entirety by reference.

BACKGROUND

1. Field of the Invention

The embodiments of the present invention relate to distributed applications and protocols used thereby. More specifically, embodiments of the present invention relate to systems, methods, and computer-readable mediums for offloaded computation of distributed application protocols within a cluster of data processing nodes.

2. Description of Related Art

Distributed applications generally use numerous protocols (i.e., distributed application protocols) to make coordinated decisions among a group of application instances. These applications and protocols are distributed among a plurality of nodes within a cluster of data processing nodes. Accordingly, such protocols are referred to herein as distributed application protocols.

Group membership monitoring, leadership election, and distributed state machine management are examples of distributed application protocols. These protocols are implemented by exchanging messages between instances of such protocols (i.e., on different nodes) using a communication network. Depending on the nature of a particular application and its guarantees of consistency across instances, the frequency and number of these messages can be quite high.

To avoid frequently interrupting an application being served by one or more distributed application protocol and to increase reliability of the one or more distributed application protocols, it has become common to implement certain distributed application protocols on groups of dedicated servers. More specifically, some distributed application protocols are deployed on servers running only those distributed application protocols. Although this approach to implementing distributed application protocols can improve latency and reliability, it is known to complicate deployment and management and to limit overall cluster scalability.

SUMMARY

Embodiments of the present invention provide an improvement over known approaches for implementing distributed application protocols. More specifically, embodiments of the present invention provide for implementation of distributed application protocols in a manner that offloads distributed real-time protocol execution to one or more dedicated management processors of nodes within a cluster of data processing nodes. The one or more dedicated management processors handle these offloaded distributed real-time protocols using one or more offload programs. Advantageously, these management processors are isolated from the application processors to reduce message latency and jitter and to avoid interruption of the application processors.

In this regard, implementing distributed application protocols in accordance with embodiments of the present invention provides for desirable performance in regard to latency and reliability while overcoming shortcomings of prior solutions in regard to complexities of deployment and management and in regard to cluster scalability.

In one embodiment, a method of offloading a distributed application protocol comprises a plurality of operations. An operation is performed for providing one or more offload programs to a management subsystem of a particular one of a plurality of data processing nodes within a cluster. The one or more offload programs provide functionality used by an application running on one or more processors within a central processing unit (CPU) subsystem of one or more of the data processing nodes. An operation is performed for executing the one or more offload program on one or more processors of the management subsystem followed by an operation being performed for providing information generated though execution of the one or more offload program to the application.

In another embodiment, a data processing node comprises a management environment, an application environment coupled to the management environment, and a shared memory segment (SMS). The management environment includes at least one management services daemon (MSD) running on one or more dedicated management processors thereof. One or more application protocols are executed by the at least one MSD on at least one of the one or more dedicated management processors. The management environment has a management interface daemon (MID) running on one or more application central processing unit (CPU) processors thereof. The SMS is accessible by the at least one MSD and the MID for enabling communication of information of the one or more application protocols to be provided between the at least one MSD and the MID. The MID provides at least one of management service to processes running within the application environment and local resource access to one or more processes running on one or more remote data processing nodes.

In another embodiment, a system on a chip (SOC) comprises a management processor core, an application processor core, and memory. The management processor core has a management services daemon (MSD) running thereon. A virtual machine is instantiated within the MSD. An application protocol is executed by the virtual machine. The application processor core is coupled to the management processor core. The memory has a shared memory segment (SMS) coupled to and accessible by the management processor core and the application processor core. The SMS enables information required for executing the application protocol to be provided from the application processor core to the management processor core and enables information generated by the application protocol to be provided to the application processor core.

These and other objects, embodiments, advantages and/or distinctions of the present invention will become readily apparent upon further review of the following specification, associated drawings and appended claims.

BRIEF DESCRIPTION OF THE DRAWINGS

FIG. 1 is a diagrammatic view showing a data processing node configured in accordance with an embodiment of the present invention.

FIG. 2 is a diagrammatic view showing an information communication arrangement configured in accordance with an embodiment of the present invention

DETAILED DESCRIPTION

Figure 3:
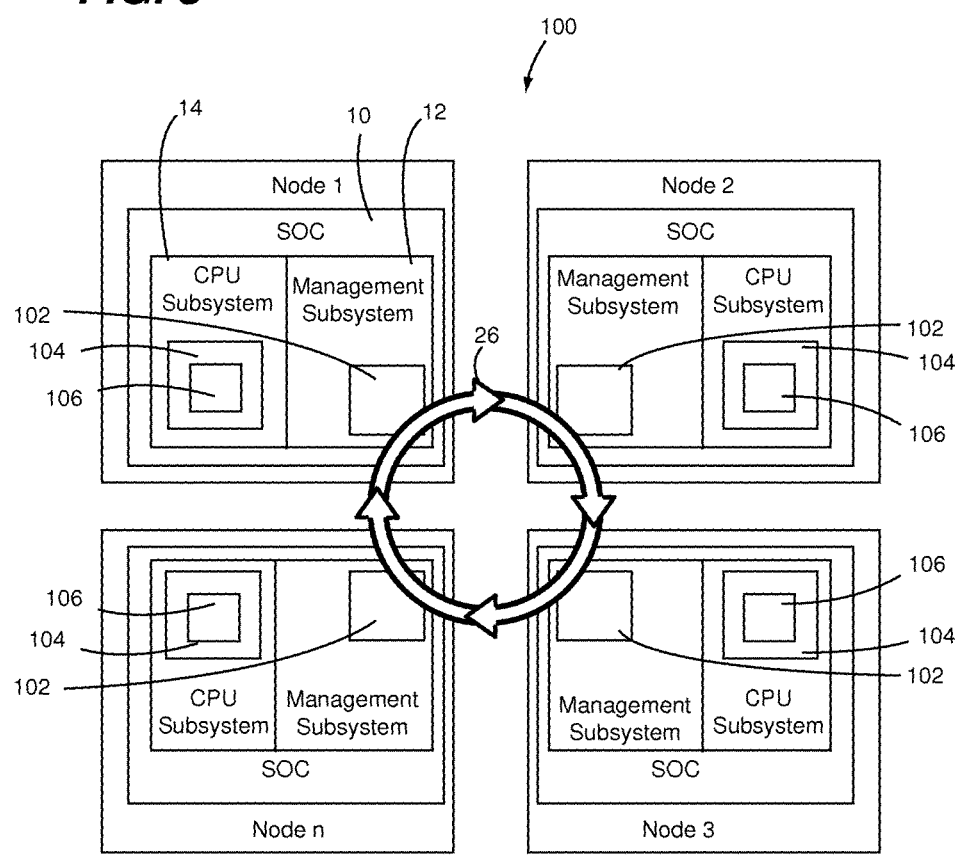
FIG. 3 is a diagrammatic view showing interaction between distributed application protocol modules configured in accordance with an embodiment of the present invention.

As shown in FIG. 1, a data processing node 1 having a system on a chip (SOC) 10 configured in accordance with an embodiment of the present invention. The SOC 10 can be one instance of a node within a cluster of such nodes (e.g., a cluster of fabric-attached nodes). The SOC 10 has a management subsystem 12 (i.e., a management environment) and an application central processing unit (CPU) subsystem 14 (i.e., an application environment) coupled to the management subsystem 12. One or more application protocols 16 are implement in (e.g., as one or more processes that reside in) the management subsystem 12 and run on a management processor unit (MPU) 18. User applications 20, which can be different applications, different instances of the same application, etc., reside in the application CPU subsystem 14 and run on a respective one or more of a plurality of application central processing units (CPUs) 22. One or more of the user applications 20 can be an instance of a distributed application that uses one or more of the application protocols 16. Similarly, one or more of the application protocols can be implemented in a distributed manner between management subsystems of a plurality of different nodes.

Each one of the application CPUs 22 includes one or more application processors and dedicated system resources (e.g., operating system, etc), thereby defining one or more application processor cores 21. The MPU 18 includes one or more dedicated management processors and associated dedicated system resources (e.g., software, utilities, status registers, UARTs, network MACs SOC configuration information, etc), thereby defining one or more management processor cores 23 that execute management software for providing initialization and ongoing management (e.g., both autonomic and remotely controlled) of the SOC 10. In contrast to memory being dedicated to each application processor core 21, memory 109 (e.g., dynamic random access memory (DRAM)) is attached to the SOC 10 and can be used by either subsystem 12 or 14, though it is primarily used for the application CPU subsystem 14. The application processor cores 21 are typically used together with an SMP (symmetric multiprocessing) operating system, so all have the same view of memory and run threads of the same applications. There is memory (not specifically shown) that is accessible only by the management subsystem 12. In this regard, the application protocols 16, any necessary portions of the MPU 18 utilized for carrying out the application protocols 16, and any necessary portion of associated memory are referred to herein as a distributed application protocol module.

FIG. 2 shows an information communication arrangement 100 configured in accordance with an embodiment of the present invention, as implemented in the data processing node 1 of FIG. 1. A management services daemon (MSD) 102 runs within the management subsystem 12 of the data processing node 1 and a management interface daemon (MID) 104 runs within the application CPU subsystem 14 (e.g., user environment) of the data processing node 1. In preferred embodiments, the MSD 102 runs on the MPU 18 of the management subsystem 12 and the MID 104 runs within the application CPU subsystem 14. The application protocols 16 are each executed by the MSD 102 on at least one of the dedicated management processors of the management processor unit (MPU) 18. An instance of the MID 104 is running within an operating system of at least one of the application processors 21. A shared memory segment SMS 106 resides in the memory 109 (e.g., dynamic random access memory (DRAM)) that is external to the SOC 10 but that is dedicated to the node 1. The SMS 106 is accessible by both the management subsystem 12 and the application CPU subsystem 14 including both the MSD 102 and the MID 104, thereby allowing the SMS 106 to be used for communicating data, programs or both between the management subsystem 12 and the application CPU subsystem 14. The SMS 106 is a relatively small region of the memory 109 attached to the SOC 10. The SMS 106 can either be reserved by firmware before the operating system (OS) boots or it can be dynamically reserved by an OS driver. In either case, the physical address range of the SMS 106 is communicated (either by the firmware or driver) before the OS boots on of the memory 109 attached to the SOC 10. The SMS 106 can either be reserved before the OS boots to the management subsystem 12 (i.e., specifically the MSD 102).

The MID 104 provides management services to local processes or local resource access to remote processes. All local user offload requests access the MSD 102 via the MID 104, which may perform admission control or arbitration. Admission control and arbitration relate to deciding whether the system (i.e., the data processing node) has sufficient resources to handle an incoming request and, if not, rejecting it. As shown, remote accesses from an internal or external operator interface 108 may directly access the MSD 102, the MID 104 or both.

Accordingly and as will be further appreciated in view of the following disclosure, the information communication arrangement 100 supports and/or enables various functionalities associated with the application protocols 16. Furthermore, in view of the disclosures made herein, a skilled person will appreciate that the information communication arrangement 100 provides for application communication with offload processors (i.e., processors of a management subsystem) through a shared memory segment accessible by isolated management code, offload virtual machines (VMs), and a daemon running on one or more application cores of a CPU subsystem that is coupled to the management subsystem.

Referring now to FIG. 3, interaction between the distributed application protocol modules (e.g., MSDs 102) of a plurality of nodes 1-$n$ configured in accordance with an embodiment of the present invention is shown. Nodes 1-$n$ depict an example of a cluster of nodes interconnected by a network interconnect fabric 26. A plurality of instances of the node 1 discussed above in reference to FIGS. 1 and 2 that are connected by a node interconnect fabric is an example of the plurality of nodes 1-$n$. Further details of interconnecting nodes by a fabric are described in U.S. Non-Provisional patent application Ser. No. 13/705,340 filed on Apr. 23, 2012 and entitled "SYSTEM AND METHOD FOR HIGHPERFORMANCE, LOW-POWER DATA CENTER INTERCONNECT FABRIC", which is incorporated herein in its entirety by reference.

The distributed application protocol module 24 of each one of the nodes 1-$n$ functions as an offload engine that is embedded in the management subsystem of the particular one of the nodes 1-$n$. The offload engine implements distributed application protocols in a manner that offloads distributed real-time protocol execution from a CPU subsystem of nodes within a cluster of nodes. More specifically, an offload engine configured in accordance with an embodiment of the present invention can be instantiated as a virtual machine that executes offload programs that are, for example, injected into the management subsystem by one or more applications running within a CPU subsystem of a node (e.g., local CPU subsystem or CPU subsystem of a remote node). As shown, the nodes 1-$n$ are interacting via messages sent between the MSD 102 of each one of the nodes 1-$n$. Communication between the nodes 1-$n$ is via the network interconnect fabric 26, while communication between MSD 102 and the MID 104 on the same node can be via some other mechanism such as, for example, the SMS 106.

Either the management or user processes, via the aforementioned communication mechanisms, explicitly request membership of a particular instance of an offload engine. Subsequently, the offload engine of one node sends appropriate and necessary messages to one or more other nodes of a cluster. These messages convey a request to a user application, management system, or in the most common case, to one or more MSDs 102 running on remote nodes. The sequencing of messages between nodes implements necessary protocol, as discussed below. The evaluation of any given message received by an MSD 102 of a node can also involve callbacks to user application code running on the node. This may be a notification of new information or a request for data or computation to be performed. More messages may result, and this will be sent from the user process to the MSD 102 and perhaps onwards to other nodes within the cluster. Although not specifically illustrated, the MSD 102 and/or MID 104 can also be interacting with non-fabric daemons on machines external to the cluster of nodes if required or desired by the particular offload being implemented.

Figure 4:
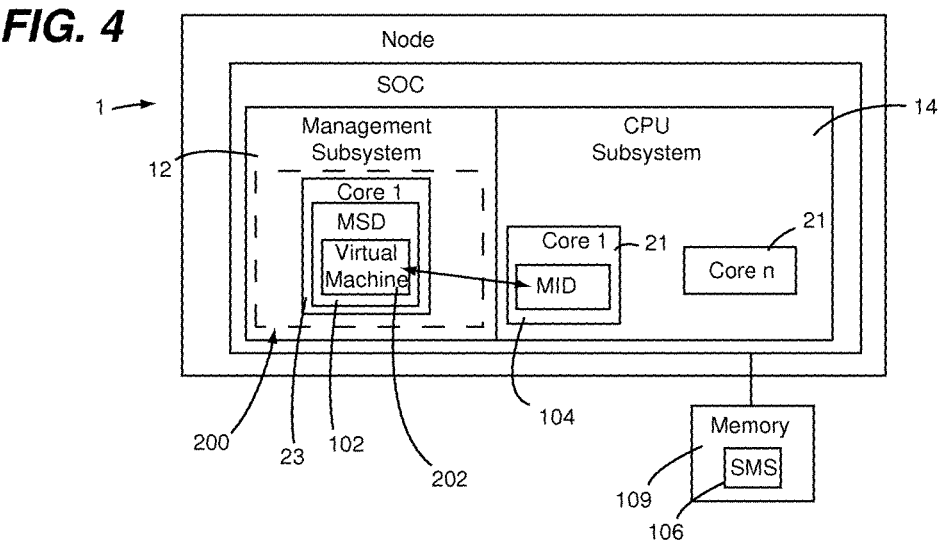
FIG. 4 is a diagrammatic view showing an execution environment configured in accordance with an embodiment of the present invention.

FIG. 4 shows an execution environment 200 configured in accordance with an embodiment of the present invention. The execution environment 200 is specifically configured to address the danger of malicious or accidental damage of system content and/or resources due to deliberate or mistaken bugs in the implementation of a distributed application protocols offload. An objective of the execution environment 200 is to implement safe, multi-tenant execution of protocols expressed using a verifiable abstract machine code executed by an externally controllable virtual machine. The execution environment 200 is implemented within the management subsystem 12 of the data processing node 1 discussed above in reference to FIG. 1. A virtual machine 202 (e.g., a software implementation of a machine (i.e. a computer) that executes programs like a physical machine) executes within an embodiment of the MSD 102.

Offload programs, which are read via the SMS 106 of the application CPU subsystem 14 are assumed to be potentially unsafe. The potential insecurity of the injected offload program can be handled using a number of approaches. One such approach involves execution-rate limiting that is guaranteed by counting the number of offload-related operations executed and number of messages sent on the network. Another such approach involves offload-related operations being constructed in such a way that random data may be read from memory without violating safety. For instance, the values to be loaded are identified by offsets into a bounded, type-checked collection of values. In this way, it is impossible to load, say, an integer instead of a floating point number, and the value loaded must have been previously computed by the program. Another such approach involves the offload-related operations being executed under the control of a management processor of the management subsystem, and external management code may observe and control the execution on a per-node, per-program basis. Another such approach involves the management code surrounding an execution container being in control of an associated virtual machine and may decide to stop or remove an offloaded program. Still another such approach involves requests for sensitive services being queued for service by the management subsystem and all requests may be denied.

Figure 5:
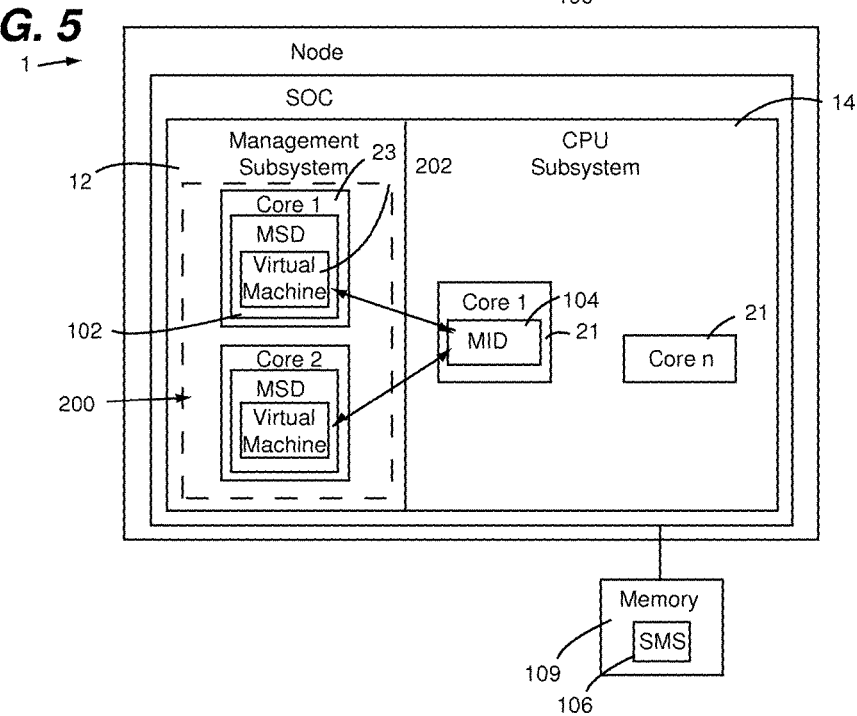
FIG. 5 is a diagrammatic view showing a multi-tenant extension of the execution environment shown in FIG. 4.

FIG. 5 illustrates an extension of the execution environment 200, which is configured to handle multiple tenants whom all wish to inject one or more respective offload programs. The MID 104 running within the application CPU subsystem 14 (e.g., on an application processor thereof) arbitrates access to the SMS 106. Each one of the offload programs is injected and interpreted in a separate (i.e., respective) execution context of the MSD 102 on one or more management processors of the management subsystem. An external interface can provide a flow of execution related events that can be provided for functionalities such as, for example, monitoring purposes and subsequent commands to rate-limit or remove offload. In this multi-tenant scenario, the virtual machine and verifiable code design allow untrusted programs to be executed safely.

In view of the disclosures made herein, a skilled person will appreciate that infrastructure of a management subsystem put in place for the offload virtual machine discussed above in reference to FIGS. 4 and 5 can be made available for use by native code offloads. More specifically, such an infrastructure can be used to provide for single-tenant native code execution with isolation from management code though use of a request/response queue pair. Native code refers to programs encoded in the instruction set/language of a real microprocessor such as that/those of the management subsystem 12 in FIGS. 4 and 5. Virtual machines, on the other hand, execute an artificial machine code that is generally more simple and abstract. The virtual machines can do so by interpreting each instruction (e.g., by an "interpreter") or by translating whole sections of the artificial machine code into native code (e.g., by a "just-in-time (JIT) compiler"). Artificial virtual machine code can be designed to be verifiable for secure execution, guaranteeing that an offload program cannot circumvent security policies of the virtual machine such as, for example, accessing data outside of the virtual machine. Native code is executed directly by the hardware, and therefore is subject to much more limited/permissive hardware security mechanisms.

Accordingly, although security cannot be strictly guaranteed, an approach of this manner provides a beneficial execution context for offload functionality. Importantly, by using a message queue-based interface to the management system for accessing sensitive services, an unverified native code can be injected without requiring exposure of a function-call API to the management code. That is, no entry point information is provided for traditional linking of the unverified offload code.

A skilled person will appreciate that various mechanisms described above in reference to FIGS. 4 and 5 provide important functionality with respect to implementing distributed application functionality in accordance with embodiments of the present invention. One such mechanism is a virtual machine. Another such mechanism offloads programs that run natively but request services for interacting with external components through a relatively secure interface. As has been previously disclosed, in preferred embodiments, the MSD 12 provides the virtual machine for multi-tenant offload and an environment for single-tenant native code offload and the MID 104 provides for either type of offload implementation to interact with a respective application via the SMS 106. The MID 104 and the SMS 106 also support offload programs being dynamically installed on one of more virtual machines.

Figure 6:
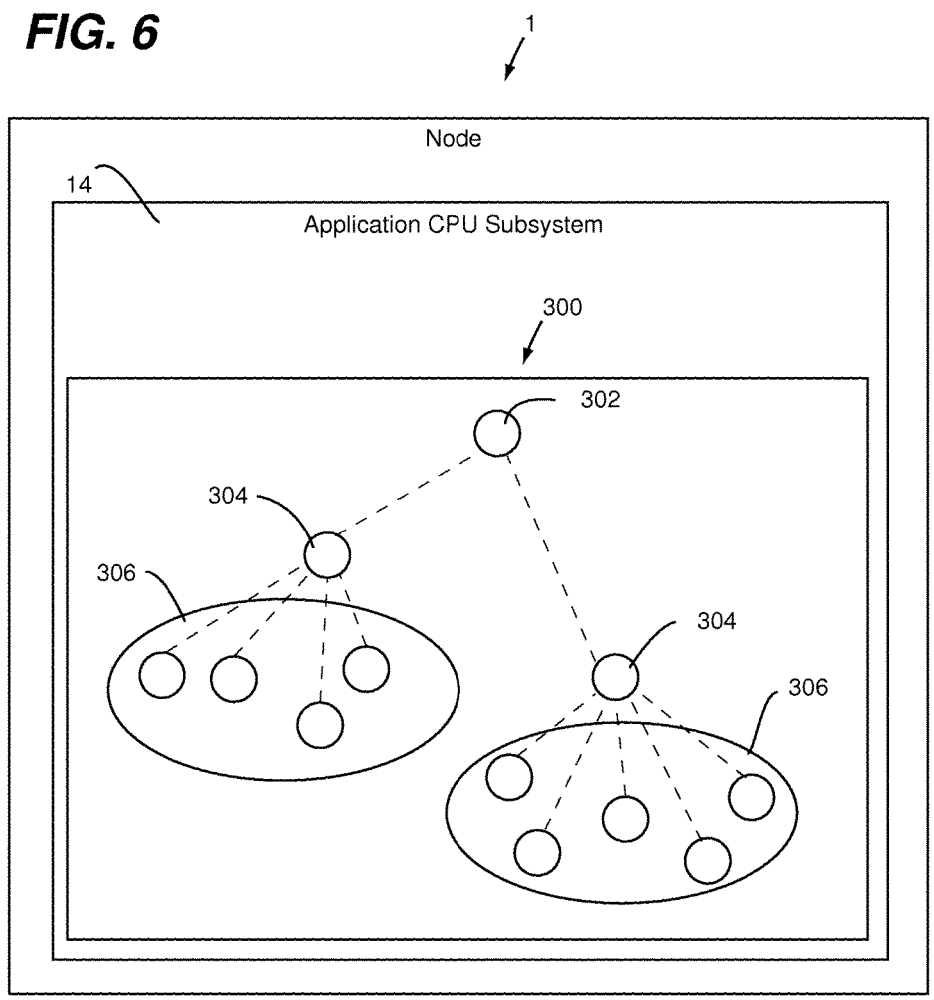
FIG. 6 is a diagrammatic view showing a supervisor tree maintained within a management subsystem configured in accordance with an embodiment of the present invention.

Presented now is a discussion of implementing offload of process group membership and process failure monitoring. Currently, application or operator monitoring software is used to maintain "heartbeats" between processes on a network or cluster of nodes (e.g., connected by a node interconnect fabric). Typically, these heartbeats operate by periodically polling each service of interest using an application-defined request. For example, FIG. 6 shows a supervisor tree 300 residing within the application CPU subsystem 14 of the node 1. The supervisor tree 300 has a root supervisor 302, a plurality of supervisor processes 304 subtending from the root supervisor 302 and a plurality of program processes 306 subtending from the supervisor processes 304. If some program process crashes, interested parties are notified by a system (e.g., the system maintaining the supervisor tree 300) that the process has failed. Optionally, the system may attempt to restart the process or redirect the work elsewhere. When implementing a supervisor tree in traditional software, application cores are interrupted to query and respond to heartbeat requests. As cluster sizes grow, these interruptions become far more frequent, with the square of the node count, as processes try to monitor one another.

Embodiments of the present invention advantageously offload supervision processes (e.g., process group membership and process failure monitoring) to out-of-band hardware/software. More specifically, in embodiments of the present invention, process status awareness (e.g., via heartbeats) between processes is maintained on the network using the MSD 102 running within the management subsystem. For example, upon receiving notification of a process failure, the MSD 102 can use internal tables to discover local processes that are interested in the failure of the remote process. It is also contemplated herein that these notifications can be distributed using features of a node interconnect fabric and that framework code of the management subsystem could potentially start another process or send service discovery updates for automatically maintained tables of services.

As a further refinement to heartbeat offload, unnecessary heartbeat messages can be eliminated by inspecting successfully transmitted application messages and using them to confirm that a particular process remains functional and accessible. Obtaining the application messages is trivially accomplished when they are sent using the messaging service of the Node Services Library ("NS Lib"). "NS Lib" is a software library linked into applications that provides numerous node services including, for example, the API used to access the MID, an event tracing API, and a messaging API. NS Lib can periodically send (e.g. via the MID) a list of known-good process group peers to the process failure detection offload process in order to suppress transmission of redundant heartbeat messages to those peers.

An additional optimization or implementation alternative for failed process detection is offloading a so-called gossip protocol to detect failed processes. Gossip protocols detect failed processes with probabilistic guarantees by periodically sending a gossip message to a single random peer. The gossip message contains information about which processes that the sender knows to be functional and which it believes to be faulty. Such protocols are useful because they can detect failure more quickly and with fewer messages, simpler implementation, and higher confidence than a traditional supervisor tree.

In another embodiment of the present invention, consensus computations that have use in functionalities such as, for example, leader election, agreement on sequence numbers, and the like are offloaded from the user/application cores of the application CPU subsystem 14 of node 1 in FIG. 1 and are executed out of band to the management subsystem 12 of the node 1. It is disclosed herein that there are a number of ways that the offload of consensus computations can be implemented. This implementation can be in the form of a hardware implementation, software running on one or more management processors, a mixed hardware/software implementation, or the like. An offload program that provides for consensus computation within the MSD 102 of the management subsystem 12 can have various policies on how to automatically choose a winning value based on differing proposals. Some of those policies can be implemented in hardware such as, for example, by software-defined networking (SDN) features of a node interconnect fabric.

Advantageously, offloading of consensus computations addresses two key problems in distributed protocols. One such problem is reducing message latency and jitter in protocol execution and the other is minimizing interruption of application processors (which in turn reduces latency and jitter in their request processing). Jitter is undesired deviation from the true periodicity of a periodic process. Practically speaking, it adds uncertainty to expected latencies. In distributed systems, overall system jitter is largely caused by operating system jitter, which is the interference of independent processes (both user and OS kernel) competing for shared hardware resources. A skilled person will appreciate that jitter can have a significant cumulative effect on latencies in a distributed system.

It is important to note that offloading of consensus computations in accordance with embodiments of the present invention imposes no semantic constraint on an associated tag or value found to be the cluster consensus for the tag. This is so that there is no constraint on the interpretation of the tag or value by the user applications, though agreement must be pre-determined on the semantics of the tags and values by the applications. The offload is simply an acceleration of the consensus, where a single winning value is chosen and communicated to all nodes in the cluster.

Figure 7:
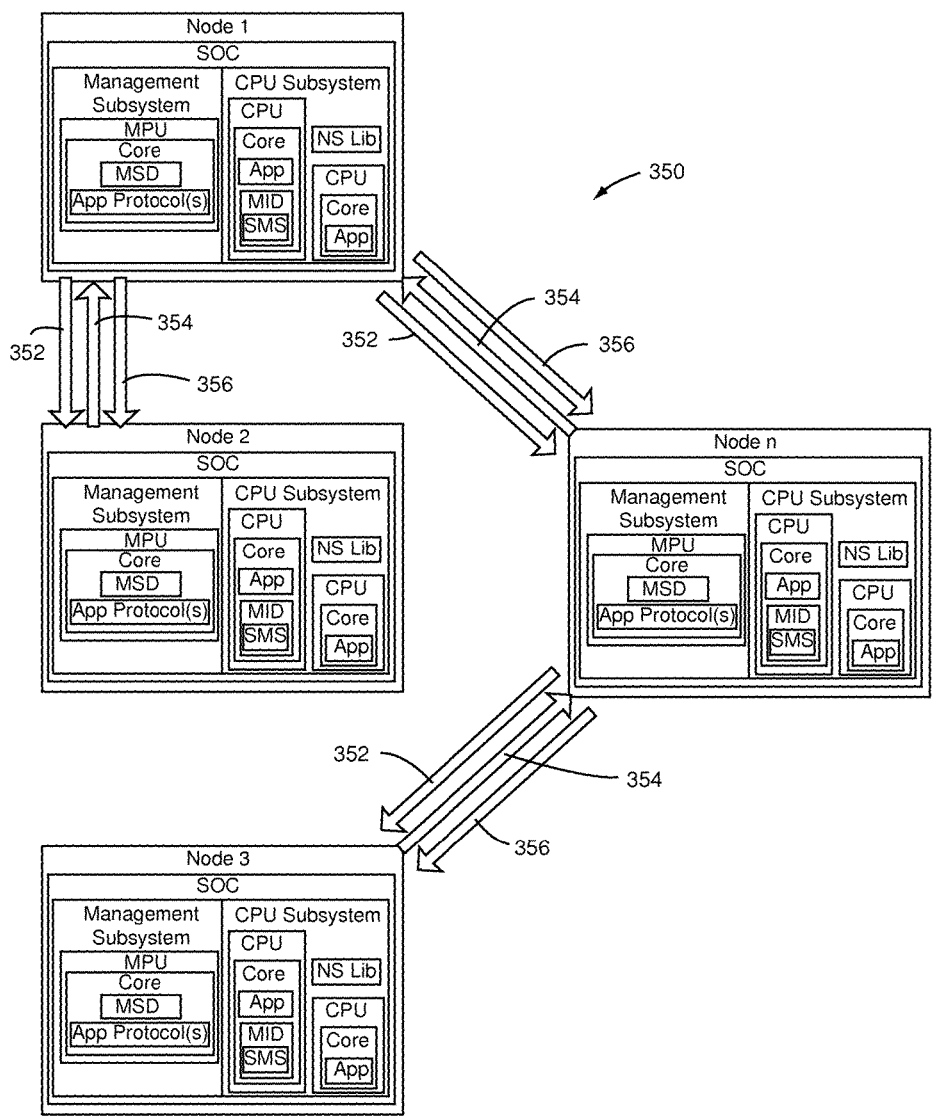
FIG. 7 is a diagrammatic view showing a messaging sequence for offloading consensus computation in accordance with an embodiment of the present invention.

FIG. 7 shows a messaging sequence 350 for offloading consensus computation in accordance with an embodiment of the present invention. A first messaging step involves an initiating node (e.g., node 1) in a cluster of nodes 1-$n$ requesting consensus on a tag by sending one or more request messages (e.g., packets) 352 containing the request and, optionally, a proposed value. A plurality of instances of the node 1 discussed above in reference to FIGS. 1 and 2 that are connected by a node interconnect fabric is an example of the plurality of nodes 1-$n$. The initiating node 1 sends the one or more request messages 352, directly or indirectly, to the other nodes for proposing an election on the tag. Specifically, the request is seeking to decide on the value the tag should be associated with by all nodes 1-$n$ in the cluster. The tag is essentially the name of a variable. Although tag and name can be used interchangeably, a tag must be unique within a consensus domain and may be an automatically generated value. A second messaging step involves each one of the nodes 1-$n$ sending one or more response messages 354 for responding with a proposed value within a given window of time. The initiating node 1 receives some of the proposed values, chooses one, and sends one or more chosen value messages 356, directly or indirectly, to the other nodes for acceptance.

The messaging sequence 350 has a number of refinements. One such refinement is that responses to the proposal may be filtered by hardware or software on a per-node basis. An example is that within the time window for the consensus, a number of incoming packets may be received by each node, and it must deterministically choose a winner to send on the node out-links. For example, the lowest address machine wins, or the highest value wins. Another such refinement is that incoming requests may be examined and determined not to be interesting to the user application processes running on a given node. These may then be propagated with no further action. Alternatively, if they are determined to be of interest to a particular local process, a callback may be invoked before, during, or after the agreement on the new value.

Another embodiment of the present invention provides for offloading of discovery of services and choice of the locally optimal provider according to a programmable fitness function using factors such as current load. This offload mechanism is similar to the group consensus discussed above, but with notable differences. One such difference is that the value chosen for the requested tag may vary across the nodes in the cluster. Another such difference is that no broadcast of the value received by the original requester is made. Yet another such difference is that the value chosen may be determined non-deterministically by each node that is propagating potential values, and nodes may choose different values for the same tag for subsequent discoveries. Still another such difference is that the ability of a node to service a particular tag may be statically or dynamically determined and may change over time. However, as with the group consensus mechanism, no semantic constraints are placed on the tag or value computed by this offload.

Figure 8:
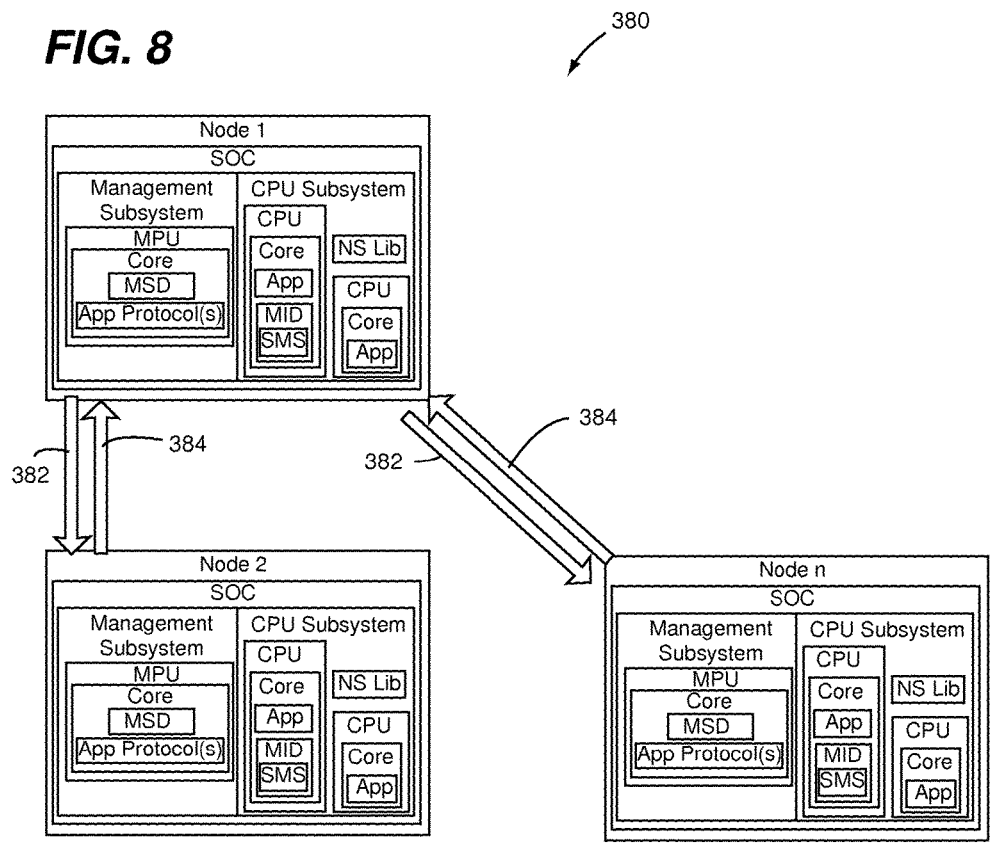
FIG. 8 is a diagrammatic view showing a programmable service discovery process configured in accordance with an embodiment of the present invention.

FIG. 8 shows a programmable service discovery process 380 configured in accordance with an embodiment of the present invention. One or more request messages (packets) 382 are used for propagation of the service location request between a plurality of nodes 1-$n$. A plurality of instances of the node 1 discussed above in reference to FIGS. 1 and 2 that are connected by a node interconnect fabric is an example of the plurality of nodes 1-$n$. Each one of the nodes 1-$n$ determines locally whether it implements the requested service and propagates that information back via one or more response messages 384. Each one of the nodes 1-$n$ examines the incoming service locations of the one or more response messages 384 received thereby and chooses one or more of the service locations (e.g., determined by an operator, a programmer, or the like). This is a collective operation that may get different answers in different parts of the cluster of nodes 1-$n$ and each one of the nodes 1-$n$ has computed a locally optimal decision about a preferred option(s) for the services. Because this is a programmable collection operation, a fitness function used to compute the locally optimal decision about the preferred option(s) for the services may be computed based on a number of arbitrary factors.

Programmable service discovery as described above in reference to FIG. 8 has a number of applications. For example, when current load is used as a factor, a least loaded one of the plurality of nodes 1-$n$ at a designated point in time can be propagated and, thus, advertised. Software of the cluster of nodes 1-$n$, in scheduling work, may use this information and service discovery process in deciding where to execute jobs.

Figure 9:
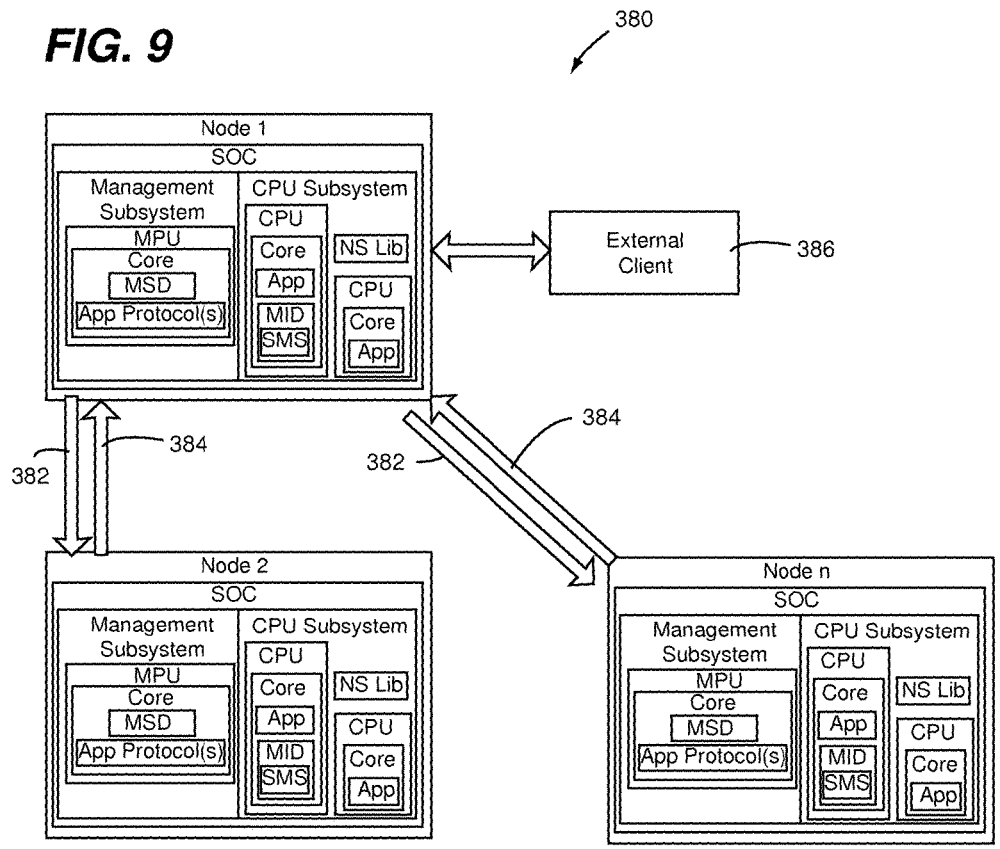
FIG. 9 is a diagrammatic view showing interaction of an external client with the programmable service discovery process of FIG. 8.

The programmable service discovery process 380 can be used to provide an improved, powerful form of distributed load balancing. As illustrated in FIG. 9, an external client 386 may enter a cluster of nodes 1-$n$ at random or algorithmically decided points, irrespective of the service they are seeking. A plurality of instances of the node 1 discussed above in reference to FIGS. 1 and 2 that are connected by a node interconnect fabric is an example of the plurality of nodes 1-$n$. By invoking the service discovery process 380 as part of the admission control procedure, the node receiving the request (i.e., node 1 which receives the one or more request messages 382) may choose the locally best option(s) for this request, thus spreading load over the available service nodes subject to the factors used in computation of the fitness function. This load spreading functionality essentially offloads an improved form of dynamic load balancing, and allows every one of the nodes 1-$nm$ of the cluster to balance load to every other one of the nodes 1-$n$, if desired, with the service discovery process 380 responding to dynamic cluster load. A locally preferred option may, for example, be nearby in terms of network hops, accessible via underutilized links, or simply physically nearby for static partitioning of load.

Another embodiment of the present invention provides for service provider discovery to steer load in order to control or respond to environmental conditions such as, for example, power usage, component temperature, etc. For example, in a case where a goal of an operator is to drive a metric (m) to be uniform across all nodes in a cluster of nodes (e.g., striving to maintain a consistent operating or ambient temperature across the cluster). Using power and temperature measurements, among other intrinsic and extrinsic factors on a per node/card/chassis/rack basis, performance of components of the nodes of the cluster can be dynamically adjusted such as, for example, slowing, speeding, or even turning off nodes to control the temperature impact of application on one or more nodes and/or environment (e.g., chassis and/or room) using non-local information to make central decisions that are optimal for the cluster as a whole.

Figure 10:
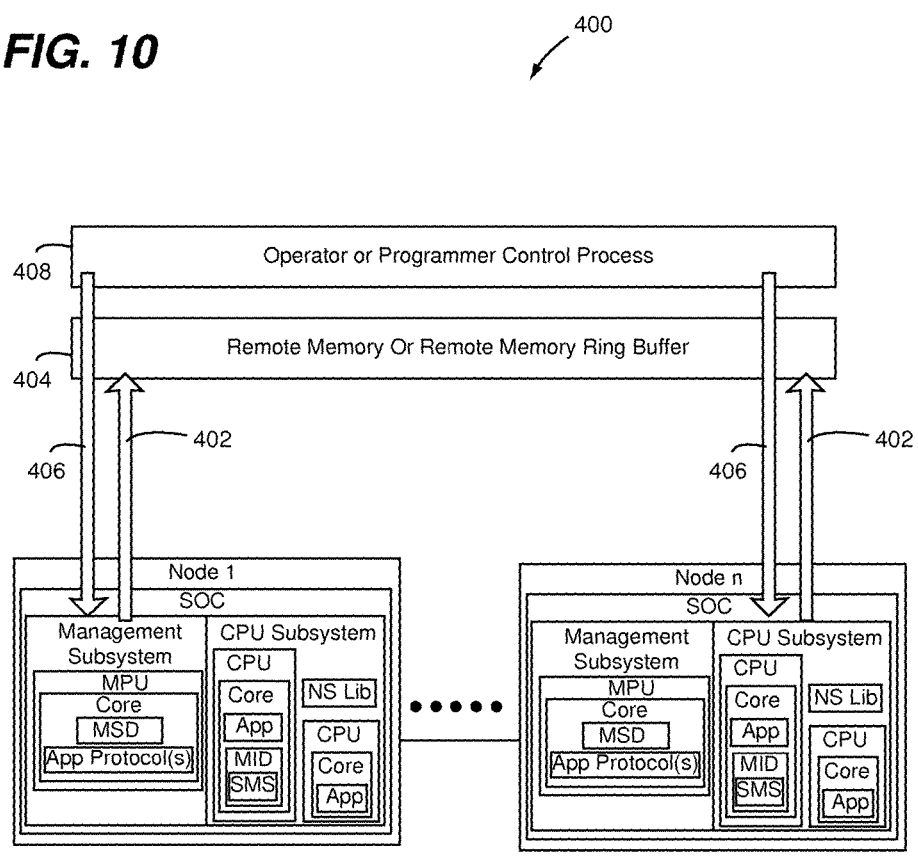
FIG. 10 is a diagrammatic view showing an operation steering process configured in accordance with an embodiment of the present invention

FIG. 10 shows an operation steering process 400 configured in accordance with an embodiment of the present invention. One or more environmental information messages (e.g., packets) 402 provide information such as, for example, power usage, temperature, load on the CPUs, etc. from a cluster of nodes 1-$n$. A plurality of instances of the node 1 discussed above in reference to FIGS. 1 and 2 that are connected by a node interconnect fabric is an example of the plurality of nodes 1-*n*. This is per-node information, which can be aggregated in memory 404 and/or can be sent via a messaging library (e.g., "NS Lib") to any destination. One or more control process messages (e.g., command(s)) 406 from an admission control process 408 provide proactive or reactive commands that are sent by an operator, programmer or other entity in a manual or automated fashion to adjust hardware parameters.

Examples of such adjustment of hardware parameters include, but are not limited to, adjusting fan speed, adjusting processor clock speeds, or other such adjustable parameters. In contrast to embodiment of the present invention, conventional implements involve each node of a cluster making local decisions about operating parameters in response to local measurements. However, this may be sub-optimal for the operation of the cluster as a whole.

Memory 404 can be implemented as remote memory, a remote memory ring buffer, or the like. Further details of implementing remote memory functionality are described in U.S. Non-Provisional patent application Ser. No. 13/935,108 filed Jul. 3, 2013 and entitled "IMPLEMENTING REMOTE TRANSACTION FUNCTIONALITIES BETWEEN DATA PROCESSING NODES OF A SWITCHED INTERCONNECT FABRIC", which is incorporated herein in its entirety by reference. Further details of implementing remote memory ring buffer functionality are described in U.S. Non-Provisional patent application Ser. No. 13/959,428 filed on Aug. 5, 2013 and entitled "REMOTE MEMORY RING BUFFERS IN A CLUSTER OF DATA PROCESSING NODES", which is incorporated herein in its entirety by reference.

Figure 11:
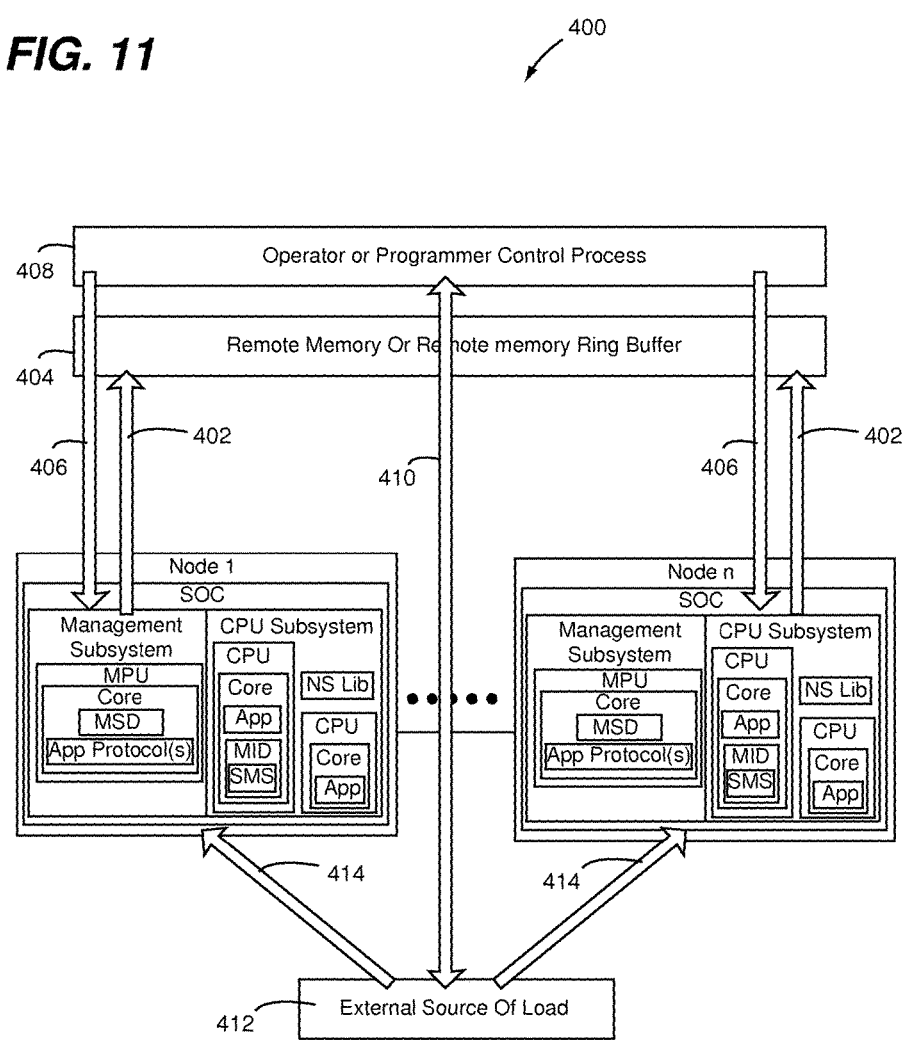
FIG. 11 is a diagrammatic view showing an incoming request steering/limiting implementation of the operation steering process shown in FIG. 10.

As shown in FIG. 11, the operation steering process 400 can be extended to steer or limit incoming requests to the applications on the cluster of nodes 1-*n*. To this end, one or more request steering messages 410 provide for interaction of a load source 412 (i.e., an external requester) providing a load in the form of an information flow 414 to one or more of the nodes 1-*n* and having its admission control process 408 running, for example, under operator control (e.g., the admission control process 408). Although illustrated as running in the operator location, this may actually be one or more nodes in the cluster itself. As part of the admission control process 408, the admission control process operator or programmer steers or redirects the incoming request to an appropriate one of the nodes 1-*n* in the cluster. Assuming that temperature, load, or any combination of per-node factors in a given cluster fitness function is being steered, the incoming environmental data is processed and then decisions are made on how to steer load towards services which are, for example, below the mean utilization, to increase the performance contribution of those nodes on the fly. At the same time, load is steered away from nodes that are overloaded according to the fitness function. Optionally, performance of the nodes in question is also decreased to, for example, lower their temperature. Note that certain fitness functions may be required to reverse this process and, in fact, increase the performance of the over-loaded nodes to reduce processing time, while decreasing the performance of nodes that are under-loaded to equalize their performance.

As a skilled person will appreciate in view of the disclosures made herein, implementation of an operation steering process in accordance with an embodiment of the present invention provides the advantageous capability to drive equilibrium in a data processing system (e.g., a data center) in a decentralized fashion to implement power, thermal, and other environment-aware continuous load balancing. Furthermore, as a skilled person will appreciate in view of the disclosures made herein, implementation of an operation steering process in accordance with an embodiment of the present invention may be combined with virtualization to move workloads around the cluster to aid in the control of the environmental factors. In the context of the present invention, virtualization is simulating multiple virtual machine instances on one physical machine. Each virtual machine generally runs its own operating system. Virtual machines run under the supervision of a hypervisor. The hypervisor often provides facilities to save, restore, and move running virtual machines. Note that this usage of "virtual machine" is distinct from the earlier usage involving an abstract machine code. In this case, the virtual machine generally executes the same instruction set as the physical machine. Rather than being involved in the execution of every instruction, the hypervisor is only invoked for certain operations, like accessing hardware components shared by multiple virtual machines.

Another embodiment of the present invention provides for caching of the results of group consensus and/or services discovery to be offloaded. One benefit of this offload functionality is optimization for decreasing latency for local requests of the group consensus and/or services discovery information. This offload functionality is essentially the addition of an ongoing task within a daemon within the management subsystem of a node configured in accordance with an embodiment of the present invention running as a persistent/ongoing computation. The persistent/ongoing computation can be determined by an operator or programmer such as to maintain a cache or table of group consensus and/or services discovery information.

Figure 12:
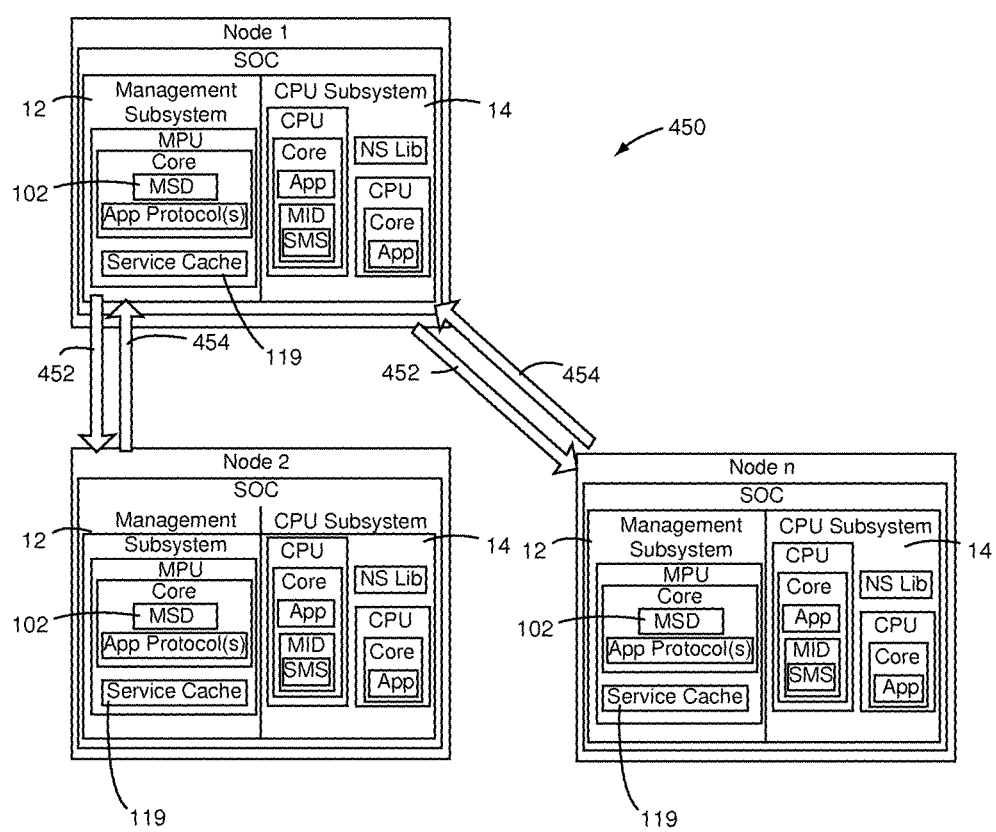
FIG. 12 is a diagrammatic view showing a discover result cache offload process configured in accordance with an embodiment of the present invention.

FIG. 12 shows a discovery result cache offload process 450 configured in accordance with an embodiment of the present invention. Each node in a cluster of nodes 1-*n* has a management subsystem 12 that is augmented with a service cache 119 holding service, consensus, or data tags and their associated current values. A management service daemon MSD 102 of each one of the nodes 1-*n* is configured to maintain the service cache 119 and to respond to queries or invalidations of contents of the service cache 119. Periodic iterations of the cache offload process 450 would be performed in conjunction with ongoing communication between the nodes 1-*n* in the form of one or more request messages 452 and one or more response messages 454.

Accordingly, as applications running within the an application CPU subsystem 14 of one or more of the nodes 1-*n* needs access to certain software services running on the cluster of nodes and given that the current locations of these services may be cached and maintained automatically by respective offload management code (e.g., of a respective offload program), the effective latency of initial access to the desired services can be lower. Furthermore, applications may declare their ability to execute certain services (such as web serving), and the offload engines in each node listen for such service discovery messages that contain the locations of the services. The Service Cache maintains a table, including the costs of using the services at given locations, for local application use. When a local application requests a service, the offload code can provide an answer with minimal latency. Still further, by scheduling periodic discoveries or consensus on a tag, applications or operators may cause the cluster to re-compute the current best options for the service, for use by the local applications. This will change in response to available servers and, in accordance with one or more of the other abovementioned embodiments of the present invention, be computed in response to environmental factors for the cluster.

Another embodiment of the present invention provides for offloading of leader process maintenance such as, for example, for the purpose of distributed locks or atomic updates to shared data structures. Examples of leader process maintenance include, but are not limited to, group membership tracking, initial leader election, leader failure monitoring, and new leader election. To this end, one embodiment of the present invention is directed to a system (e.g., one or more nodes within a cluster) identified/elected/maintained leader process that controls atomic update and access of data such as, for example, configuration information or locks. The system maintains consensus on which process is to be designated for performing the function of maintaining a slice of a table of locks or other data in local or remote memory. The designated process becomes responsible for answering lock/unlock or other requests from other processes on one or more nodes within a cluster of nodes. A plurality of instances of the node 1 discussed above in reference to FIGS. 1 and 2 that are connected by a node interconnect fabric is an example of such a cluster of nodes. Notably, the system itself ensures safe choice of the process including, but not limited to, blocking other processes that in the past were responsible for the data. The result of such an embodiment of the present invention is a decentralized distributed locks and other data service whose offloading to the management subsystem of one or more nodes within a cluster precludes it from require CPU subsystem processor cycles for maintenance.

Implementation of distributed application protocols as taught herein avoid shortcomings of prior solutions by offloading distributed real-time protocol execution to dedicated management processors of nodes with a cluster of data processing nodes. These management processors are isolated from the application processors to reduce message latency and jitter and to avoid interruption of the application processors. The management processors may, for example, be provided by a management subsystem in an SOC-based server, such as the Calxeda ECX-2000. The offloaded protocols may be standard services, such as group membership and leader election, that are provided by a management framework of an SOC node or they may be arbitrary application-specific protocols that are dynamically deployed to the management processors.

As presented above, implementation of an offload engine configured in accordance with an embodiment of the present invention and offloading distributed real-time protocol execution in accordance with an embodiment of the present invention can be implemented via one or more data processing node (i.e., nodes) of a cluster of data processing nodes. Furthermore, it has been disclosed that a preferred implementation is on a data processing node comprising a system on a chip (SOC). However, in view of the disclosures made herein, a skilled person will appreciate that such implementation of an offload engine and implementation of offloading distributed real-time protocol execution is not limited to a particular type or configuration of data processing node or data processing apparatus.

In view of the disclosures made herein, a skilled person will appreciate that a system on a chip (SOC) refers to integration of one or more processors, one or more memory controllers, and one or more I/O controllers onto a single silicon chip. Furthermore, in view of the disclosures made herein, the skilled person will also appreciate that a SOC configured in accordance with the present invention can be specifically implemented in a manner to provide functionalities definitive of a server. In such implementations, a SOC in accordance with the present invention can be referred to as a server on a chip. In view of the disclosures made herein, the skilled person will appreciate that a server on a chip configured in accordance with the present invention can include a server memory subsystem, a server I/O controllers, and a server node interconnect. In one specific embodiment, this server on a chip will include a multi-core CPU, one or more memory controllers that support ECC, and one or more volume server I/O controllers that minimally includes Ethernet and SATA controllers. The server on a chip can be structured as a plurality of interconnected subsystems, including a CPU subsystem, a peripherals subsystem, a system interconnect subsystem, and a management subsystem.

An exemplary embodiment of a server on a chip that is configured in accordance with the present invention is the ECX-1000 Series server on a chip offered by Calxeda incorporated. The ECX-1000 Series server on a chip includes a SOC architecture that provides reduced power consumption and reduced space requirements. The ECX-1000 Series server on a chip is well suited for computing environments such as, for example, scalable analytics, web-serving, media streaming, infrastructure, cloud computing and cloud storage. A node card configured in accordance with the present invention can include a node card substrate having a plurality of the ECX-1000 Series server on a chip instances (i.e., each a server on a chip unit) mounted on the node card substrate and connected to electrical circuitry of the node card substrate. An electrical connector of the node card enables communication of signals between the node card and one or more other instances of the node card.

The ECX-1000 Series server on a chip includes a CPU subsystem (i.e., a processor complex) that uses a plurality of ARM brand processing cores (e.g., four ARM Cortex brand processing cores), which offer the ability to seamlessly turn on-and-off up to several times per second. The CPU subsystem is implemented with server-class workloads in mind and comes with an ECC L2 cache to enhance performance and reduce energy consumption by reducing cache misses. Complementing the ARM brand processing cores is a host of high-performance server-class I/O controllers via standard interfaces such as SATA and PCI Express interfaces. Table 3 below shows technical specification for a specific example of the ECX-1000 Series server on a chip.

TABLE 3

Example of ECX-1000 Series server on a chip technical specification

| | |
|---|---|
| Processor Cores | 1. Up to four ARM ® Cortex ™-A9 cores @ 1.1 to 1.4 GHz<br>2. NEON ® technology extensions for multimedia and SIMD processing<br>3. Integrated FPU for floating point acceleration<br>4. Calxeda brand TrustZone ® technology for enhanced security<br>5. Individual power domains per core to minimize overall power consumption |
| Cache | 1. 32 KB L1 instruction cache per core<br>2. 32 KB L1 data cache per core<br>3. 4 MB shared L2 cache with ECC |
| Fabric Switch | 1. Integrated 80 Gb (8 × 8) crossbar switch with through-traffic support<br>2. Five (5) 10 Gb external channels, three (3) 10 Gb internal channels<br>3. Configurable topology capable of connecting up to 4096 nodes<br>4. Dynamic Link Speed Control from 1 Gb to 10 Gb to minimize power and maximize performance<br>5. Network Proxy Support to maintain network presence even with node powered off |

TABLE 3-continued

Example of ECX-1000 Series server on a chip technical specification

| | |
|---|---|
| Management Engine | 1. Separate embedded processor dedicated for systems management<br>2. Advanced power management with dynamic power capping<br>3. Dedicated Ethernet MAC for out-of-band communication<br>4. Supports IPMI 2.0 and DCMI management protocols<br>5. Remote console support via Serial-over-LAN (SoL) |
| Integrated Memory Controller | 1. 72-bit DDR controller with ECC support<br>2. 32-bit physical memory addressing<br>3. Supports DDR3 (1.5 V) and DDR3L (1.35 V) at 800/1066/1333 MT/s<br>4. Single and dual rank support with mirroring |
| PCI Express | 1. Four (4) integrated Gen2 PCIe controllers<br>2. One (1) integrated Gen1 PCIe controller<br>3. Support for up to two (2) PCIe ×8 lanes<br>4. Support for up to four (4) PCIe ×1, ×2, or ×4 lanes |
| Networking Interfaces | 1. Support 1 Gb and 10 Gb Ethernet<br>2. Up to five (5) XAUI 10 Gb ports<br>3. Up to six (6) 1 Gb SGMII ports (multiplexed w/XAUI ports)<br>4. Three (3) 10 Gb Ethernet MACs supporting IEEE 802.1Q VLANs, IPv4/6 checksum processing, and TCP/UDP/ICMP checksum offload<br>5. Support for shared or private management LAN |
| SATA Controllers | 1. Support for up to five (5) SATA disks<br>2. Compliant with Serial ATA 2.0, AHCI Revision 1.3, and eSATA specifications<br>3. SATA 1.5 Gb/s and 3.0 Gb/s speeds supported |
| SD/eMMC Controller | 1. Compliant with SD 3.0 Host and MMC 4.4 (eMMC) specifications<br>2. Supports 1 and 4-bit SD modes and 1/4/8-bit MMC modes<br>3. Read/write rates up to 832 Mbps for MMC and up to 416 Mbps for SD |
| System Integration Features | 1. Three (3) I2C interfaces<br>2. Two (2) SPI (master) interface<br>3. Two (2) high-speed UART interfaces<br>4. 64 GPIO/Interrupt pins<br>5. JTAG debug port |

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable medium(s) having computer readable program code embodied thereon.

Any combination of one or more computer readable medium(s) (e.g., non-transitory computer readable medium(s)) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are/can be described herein with reference to textual descriptions, flowchart illustrations and/or block diagrams of methods, apparatus (systems) and computer program products according to embodiments of the present invention. It will be understood that portions of the textual descriptions, flowchart illustrations and/or block diagrams, and combinations thereof can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the textual descriptions, flowchart illustrations and/or block diagrams, and combinations thereof. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the textual descriptions, flowchart illustrations and/or block diagrams, and combinations thereof. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the textual descriptions, flowchart illustrations and/or block diagrams, and combinations thereof.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A system on a chip (SOC), comprising: a management processor core having:
    a management services daemon (MSD) running thereon, wherein a virtual machine is instantiated within the MSD, and wherein an application protocol is executed by the virtual machine; and
    a service cache accessible by the management processor core, wherein the application protocol being executed by the MSD requires accessing one or more services running on a node comprising the SOC and a remote node connected to the SOC, and the application protocol being executed by the MSD includes the MSD accessing, from within the service cache, a location of the one or more services and an associated latency cost of using the one or more services at the location, for providing reduced latency of an initial access of the one or more services;
    an application processor core coupled to the management processor core, wherein the application processor core is a different and isolated processor core than the management processor core, wherein, upon receiving notification of a process failure, the management processor core starts another process and uses internal tables to discover local processes, wherein the application processor core has a management interface daemon (MID) running thereon and the MO distinct and separate from the MSD; and
    memory having a shared memory segment (SMS) coupled to and accessible by the management processor core and the application processor core for enabling information required for executing the application protocol to be provided from the application processor core to the management processor core and enabling information generated by the application protocol to be provided to the application processor core.

2. The SOC of claim 1 wherein the MSD reads the application protocol from the SMS.

3. The SOC of claim 1 wherein:
    the MID provides at least one of a management service to processes running within an application environment comprising the application processor core and local resource access to one or more processes running on the remote node connected to the SOC.

* * * * *